United States Patent [19]

Buonavita

[11] 4,074,146
[45] Feb. 14, 1978

[54] LOAD SHARING MODULAR POWER SUPPLY SYSTEM

[75] Inventor: Carlos Ernesto Buonavita, South Pasadena, Calif.

[73] Assignee: Burroughs Corporation, Detroit, Mich.

[21] Appl. No.: 662,636

[22] Filed: Mar. 1, 1976

Related U.S. Application Data

[62] Division of Ser. No. 593,070, July 3, 1975, Pat. No. 4,032,830.

[51] Int. Cl.$^2$ ............................................. H02J 1/04
[52] U.S. Cl. ................................. 307/60; 307/52; 307/69
[58] Field of Search ............... 307/52, 60, 43, 69, 307/150

[56] References Cited

U.S. PATENT DOCUMENTS

| | | | |
|---|---|---|---|
| 3,067,334 | 12/1962 | Byloff et al. | 307/60 |
| 3,480,789 | 11/1969 | Binckley et al. | 307/69 |
| 3,600,599 | 8/1971 | Wright et al. | 307/69 |
| 3,602,799 | 8/1971 | Guillen | 307/60 |
| 3,704,381 | 11/1972 | Nercessian | 307/60 |
| 3,831,080 | 8/1974 | Zabert et al. | 307/43 |

Primary Examiner—James R. Scott
Assistant Examiner—Eugene S. Indyk
Attorney, Agent, or Firm—Alfred W. Kozak; Nathan Cass; Kevin R. Peterson

[57] ABSTRACT

A power supply employing a clock-driven D.C.-A.C.-D.C. converter having a current transformer in the A.C. section to develop a trapezoidal current feedback pulse train which is then converted to a trapezoidal voltage pulse train. A comparator compares the trapezoidal voltage pulse train to a voltage reference level set such that it is normally crossed by the ramp portion of each trapezoidal voltage pulse. Upon occurrence of a ramp crossing, which varies with the level of the output current, a control pulse is produced by the comparator and supplied to gating logic which develops driving pulse trains for the D.C.-A.C.-D.C. converter and cuts off each driving pulse upon occurrence of a control pulse. The resulting power supply constitutes a voltage-controlled constant current power supply which may be connected with an arbitrary number of other such supplies to a power bus and a common feedback-controlled voltage reference source.

4 Claims, 5 Drawing Figures

FIG. 3

FIG. 4
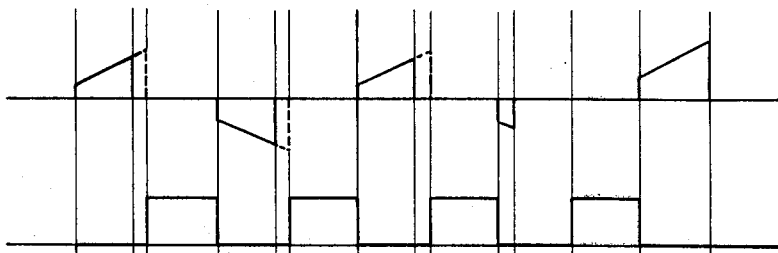
FIG. 4A_  I
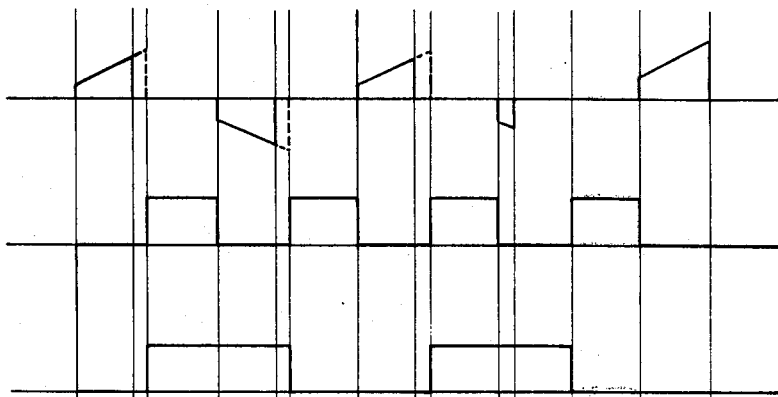
FIG. 4B_  CLOCK
FIG. 4C_  F₁
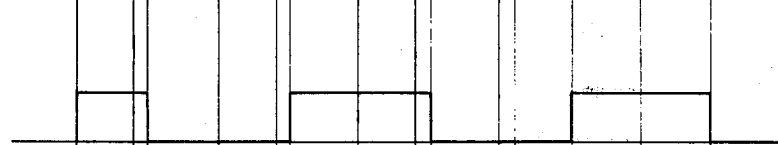
FIG. 4D_  F̄₁
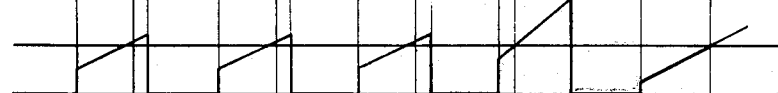
FIG. 4E_  V_REF
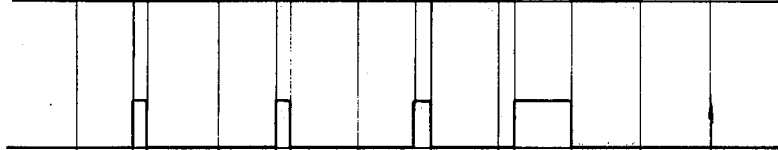
FIG. 4F_  F₂
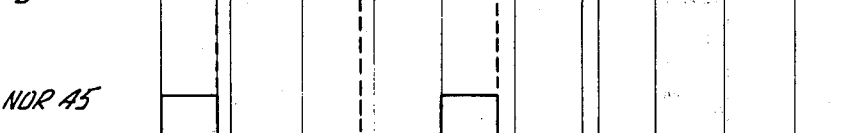
FIG. 4G_  NOR 45
FIG. 4H_  NOR 47
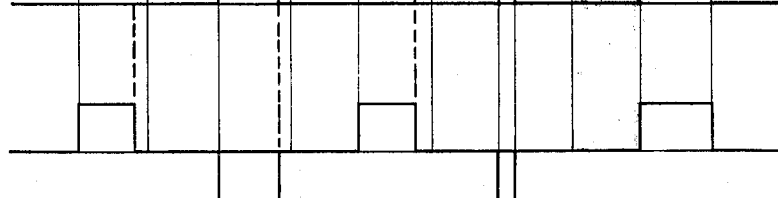
FIG. 4I_  V

LOAD SHARING MODULAR POWER SUPPLY SYSTEM

This is a division of application Ser. No. 593,070, filed July 3, 1975, now U.S. Pat. No. 4,032,830.

BACKGROUND OF THE INVENTION

This invention relates to power supplies employing D.C.-A.C.-D.C. conversion and more specifically to such power supplies capable of being connected in variable numbers to a power bus for meeting various output power requirements. The design of the basic power unit which is used in this modular system of load sharing power supplies is also described in U.S. Ser. No. 593,070, filed July 3, 1975 now U.S. Pat. No. 4,032,830 and entitled Modular Constant Current Power Supply.

Circuitry for accomplishing D.C.-A.C.-D.C. power conversion is well-known in the art. Such circuits generally employ switching means such as power transistors or SCR's set up to modulate an unregulated D.C. supply level. The modulation is accomplished by either clock-driving the power switching means or configuring the power switching means in self-oscillating circuits. It is also generally known to provide feedback of the output voltage of such circuits to control either the frequency or duration of the excitation of the converter switching elements. Such use of feedback is illustrated in the converter circuits of U.S. Pat. No. 3,824,441 issued to Heyman et al. on July 16, 1974 and U.S. Pat. No. 3,670,234 issued to Joyce on June 13, 1972.

However, none of these prior art circuits have exhibited sufficient responsiveness to changing output load conditions to enable them to be practically used in multiple configurations to provide varying amounts of power required by diverse loads. Particularly in the area of computer systems where diverse system size and power requirements exist, the flexibility attainable from a modular power supply has appeared to be of immeasurable value, especially in eliminating excessive costs required to adapt power supplies to various load requirements.

SUMMARY OF THE INVENTION

Hence, it is an object of the invention to provide a new and improved power supply, which power supply may be configured in a modular parallel arrangement in order that each of the multiple number of power supplies may individually supply a given share of the full output current load. This may be arranged so that each of the modular power supplies will provide an equal current share with all the rest, or the modular power supplies may be of different capacities and so arranged that each individual supply will provide a predetermined proportional amount of current which contributes to the final total current load desired.

It is another object of the invention to provide a power supply employing D.C.-A.C.-D.C. conversion and connectable in arbitrary numbers to supply arbitrary load power requirements.

It is yet another object of the invention to provide an improved feedback regulation scheme for D.C.-A.C.-D.C. power supplies which is not dependent on the prior technique of monitoring output voltage.

These and other objects of the invention are accomplished by monitoring the ramp characteristic of current pulses outputted by the power switching means of a D.C.-A.C.-D.C. converter and developing a feedback ramp voltage waveform proportional to those current pulses. A control pulse is developed each time the ramp voltage waveform exceeds a reference level, which is set such that a control pulse is normally produced during each activation period of a power switching means. The control pulses and a clock signal are fed to gating logic which supplies the power switching means with a train of drive pulses, each of which is terminated by the occurrence of a control pulse. Since a variation in output current level results in variation in the time of occurrence of a control pulse, the duration of the drive pulses supplied to the power switching means also varies in response to a deviation in output current level, resulting in current regulation. Furthermore, variation in the reference voltage level results in control of the output voltage, resulting in an additional degree of control over the output power.

BRIEF DESCRIPTION OF THE DRAWINGS

A particular manner of implementing the just summarized invention and further advantages obtainable by such implementation will now be detailed in the following description of the preferred embodiment of the invention, read in conjunction with the drawings of which:

FIG. 3 is a circuit diagram of the power switching control circuitry of the preferred embodiment of the invention.

FIG. 4 illustrates waveforms at various points in the preferred embodiment of the invention.

FIG. 5 illustrates a configuration of a number of modular power supplies of the invention on a single power bus.

DETAILED DESCRIPTION OF THE PREFERRED EMBODIMENT

Figure 1:
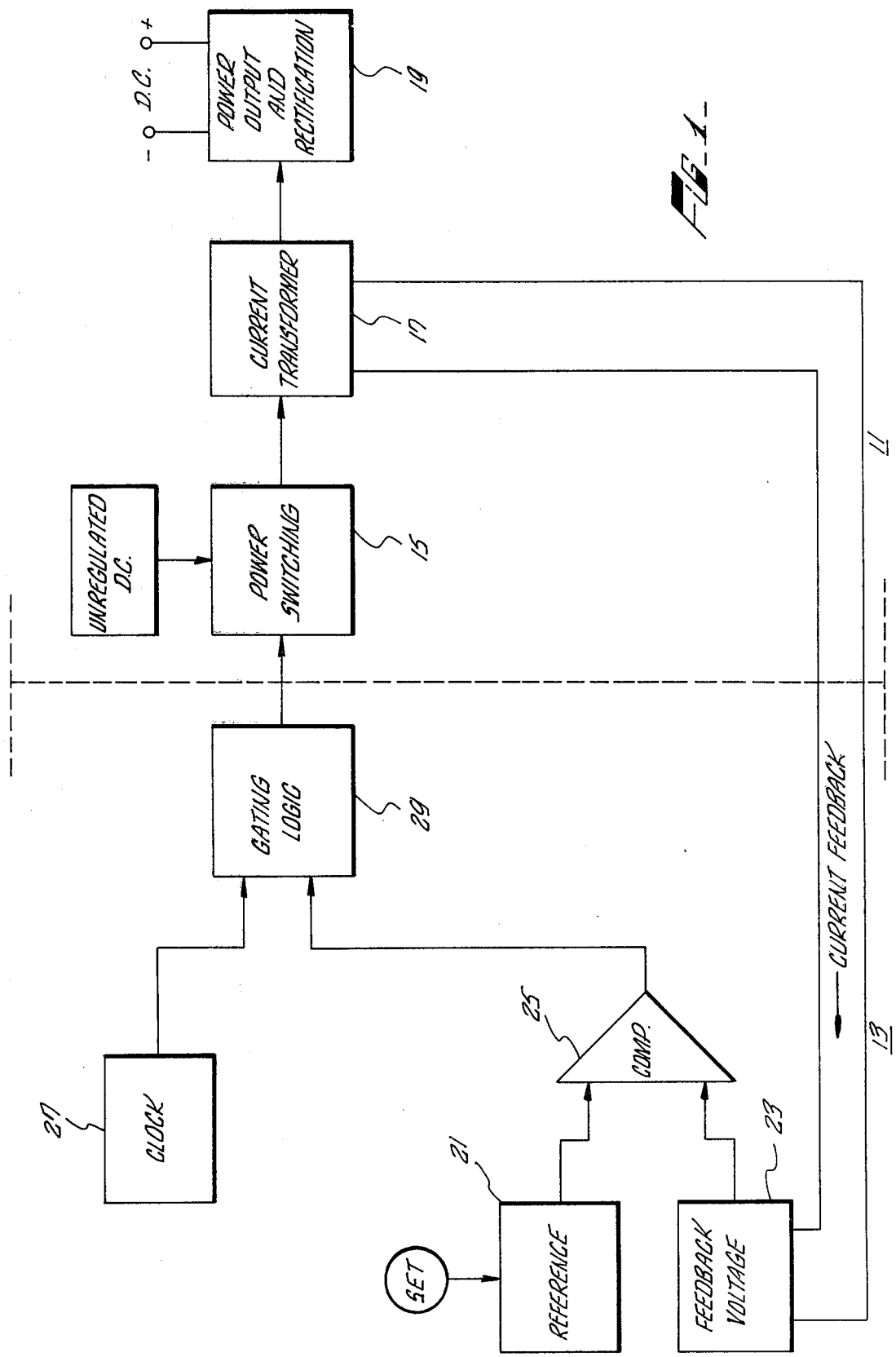
FIG. 1 is a block diagram illustrating the preferred embodiment of the invention in generalized form.

The power supply of the preferred embodiment of the invention may be thought of as comprising two units, a power converter unit 11 and a control unit 13 for controlling the power converter 11 in response to feedback information. The power converter 11 of FIG. 1 includes a power output and rectification section 19, a power switching transistor section 15 and a current transformer 17. The control unit 13 controls the switching transistor section 15 in accordance with control information provided by feedback from the current transformer 17. This information is developed by a feedback voltage unit 23 which develops a voltage for comparison to a voltage reference 21 by a comparator 25. Clock gating and logic circuitry 29 controls a clock signal from a clock 27 in accordance with the output of the comparator 25 to properly trigger the power switching circuitry 15.

Figure 2:
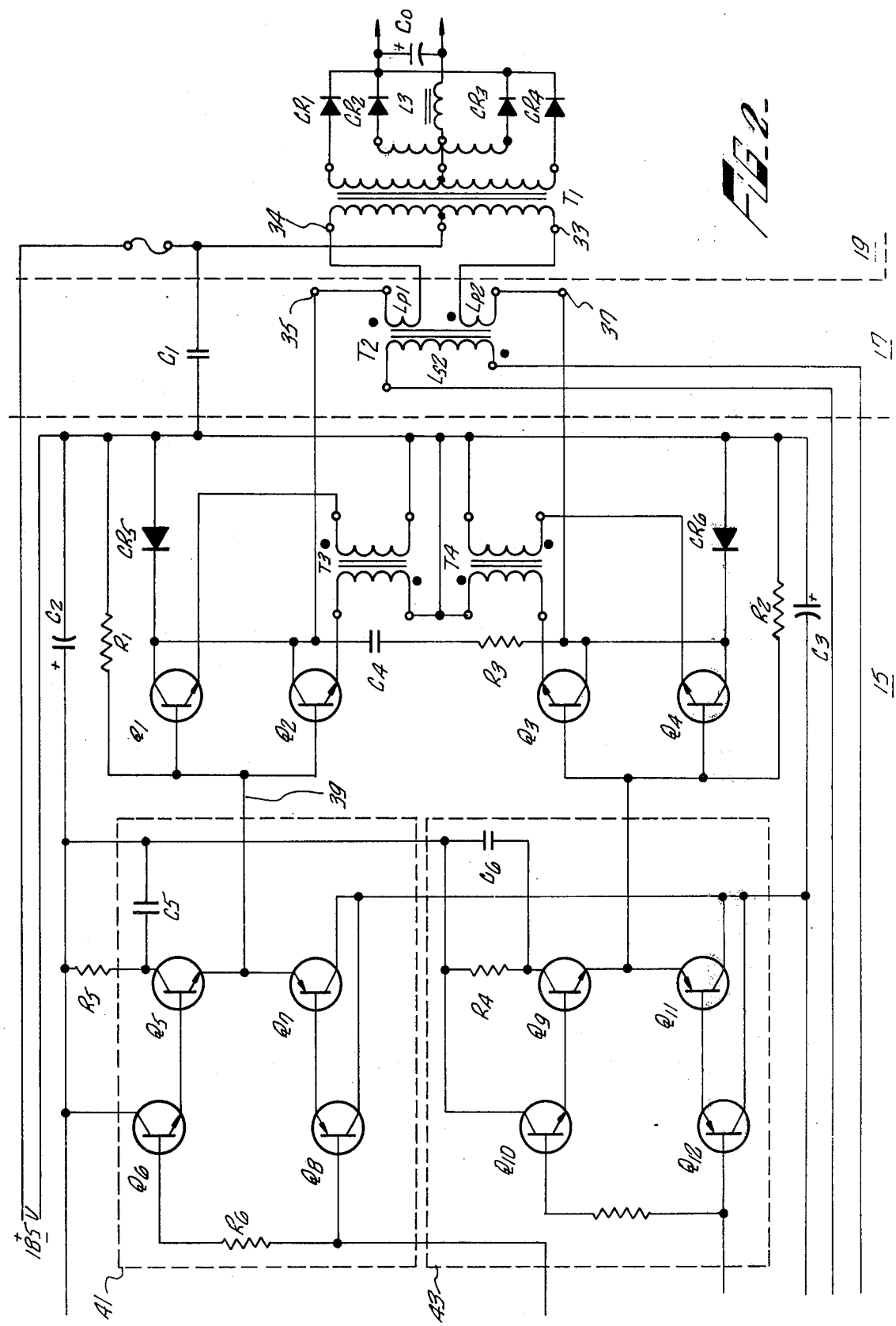
FIG. 2 is a circuit diagram illustrating the power switching circuitry and output section of the preferred embodiment of the invention.
Figure 6:
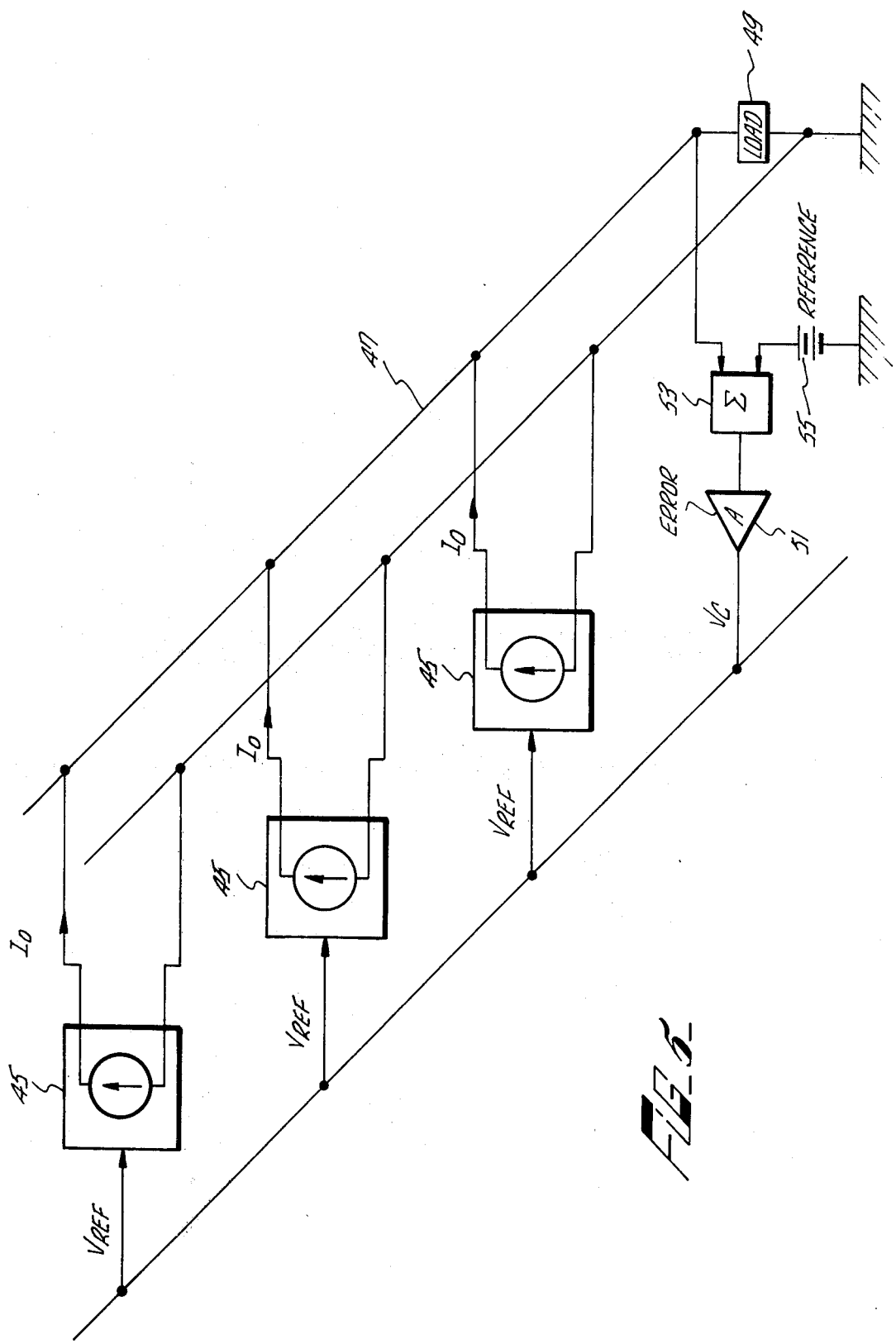

The power output and rectification circuitry 19 shown in FIG. 2 includes a power transformer $T_1$ having a center tap on both the primary and secondary windings. Coupled to the secondary of the power transformer $T_1$ is a full wave rectifier including four diodes $CR_1$, $CR_2$, $CR_3$, $CR_4$. The anodes of the diodes $CR_1$, $CR_2$, $CR_3$ and $CR_4$ are connected to the secondary winding of the transformer $T_1$, and the cathodes of each of the diodes $CR_1$, $CR_2$, $CR_3$, $CR_4$ are connected together into one terminal of a capacitor $C_0$. The other terminal of the capacitor $C_4$ is connected to a choke input coil $L_3$, which also connects to the secondary of the transformer $T_1$. The diodes $CR_1$, $CR_2$, $CR_3$, $CR_4$, coil $L_3$ and capacitor $C_0$ serve to convert the waveform present at the secondary of the transformer $T_1$ into a D.C. voltage across the capacitor $C_0$.

One off-center terminal 34 of the primary of the power transformer $T_1$ is connected to the first primary coil $L_{p1}$ of a current transformer $T_2$. The other off-center tap 33 of the primary of the transformer $T_1$ is connected to the second primary coil $L_{p2}$ of the current transformer $T_2$. The second teerminal 35 of the first primary coil $L_{p1}$ of the current transformer $T_2$ is connected to the collector of two power switching transistors $Q_1$, $Q_2$, and the other terminal 37 of the second primary coil $L_{p2}$ of the current transformer $T_2$ is connected to the collectors of two power transistors $Q_3$, $Q_4$. The secondary $L_{s2}$ of the current transformer $T_2$ supplies a feedback signal to the control circuitry 13. As a result of these connections, when unregulated D.C. voltage is supplied to the center tap of the primary of the transformer $T_1$, it is also supplied to the collectors of each of the power switching transistors $Q_1$, $Q_2$, $Q_3$, $Q_4$.

In discussing the operation of these power switching transistors $Q_1$, $Q_2$, $Q_3$, $Q_4$, it is helpful to consider the interconnection of one pair of transistors $Q_1$, $Q_2$. As before noted, the collectors of each of these transistors $Q_1$, $Q_2$ are connected to the first primary coil $L_{p1}$ of the current transformer $T_2$. Both collectors are also connected to the unregulated voltage return line via a diode $CR_5$, which is a voltage spike suppressor not absolutely essential for circuit operation. The base of each of the power transistors $Q_1$, $Q_2$ is connected to one input terminal 39 of a section 41 of the power transistor driver circuitry. The emitter of the transistor $Q_1$ is connected to the first terminal of one side of a current equalizing transformer $T_3$, while the emitter of the second power switching transistor $Q_2$ is connected to the first terminal of the opposite side of the current equalizing transformer $T_3$. The second terminals of the two sides of the current equalizing transformer $T_3$ are connected together to the return or common of the 185V source.

When a square current pulse is received at the bases of the power transistors $Q_1$, $Q_2$ from the driver circuitry section 41, these transistors $Q_1$, $Q_2$ are turned on. A trapezoidal waveform (FIG. 4A) is then developed at the collectors of these transistors $Q_1$, $Q_2$, and is transmitted via the secondary of the current transformer $T_2$ to the control circuitry 13. The current equalizing transformer $T_3$ then serves to equalize the current output of the power transistors $Q_1$, $Q_2$. While two power transistors such as $Q_1$, $Q_2$ are used in the preferred embodiment, an operative circuit could easily be configured with one or more such power transistors.

As may be apparent, the second pair of power switching transistors $Q_3$ and $Q_4$ are configured analogously to the transistors $Q_1$, $Q_2$. Additionally, a resistor $R_3$ and a capacitor $C_4$ are provided connecting the junction of the collectors of the first pair of power switching transistors $Q_1$ and $Q_2$ and the first primary coil $L_{p1}$ of the current transformer $T_2$ to the junction point of the collectors of transistors $Q_3$, $Q_4$ and the terminal 37 of the second primary coil $L_{p2}$ of the current transformer $T_2$. These two elements $R_3$, $C_4$ provide spike suppression and are again not absolutely essential to circuit operation.

The driver circuitry includes two separate driver units 41, 43, one for each pair of power switching transistors $Q_1$, $Q_2$ and $Q_3$, $Q_4$. The first driver unit comprises 4 driver transistors $Q_5$, $Q_6$, $Q_7$, $Q_8$. The collectors of the actuating transistors $Q_5$, $Q_6$ are connected to a positive D.C. bias source, which is isolated from the unregulated D.C. source common by a capacitor $C_2$. The collectors of the turn-off transistors $Q_8$, $Q_7$ are connected to an auxiliary voltage source, which is connected to the unregulated D.C. source common via a capacitor $C_3$. The base of the actuating transistor $Q_6$ is connected via a resistor $R_6$ to the base of a transistor $Q_8$, which is in turn connected to the output of a NOR gate 45, part of the control circuitry 13 illustrated in FIG. 3. A "high" or "true" output from this NOR gate 45 turns on the actuating transistors $Q_6$, $Q_5$, and provides a trigger pulse to the bases of the power transistors $Q_1$, $Q_2$. A "low" or "false" level from the NOR gate 45 activates the turn-off transistors $Q_7$, $Q_8$, pulling current out of the base of the power transistors $Q_1$, $Q_2$. The second set of driver transistors $Q_9$, $Q_{10}$, $Q_{11}$, $Q_{12}$ are analogously biased and connected to be triggered by an output from a NOR gate 47 of the control circuitry of FIG. 3 and to drive the bases of the second pair of power switching transistors $Q_3$, $Q_4$. The manner of triggering outputs from the NOR gates 45, 47 will now be described with reference to FIG. 3 and FIG. 4.

Figure 3:
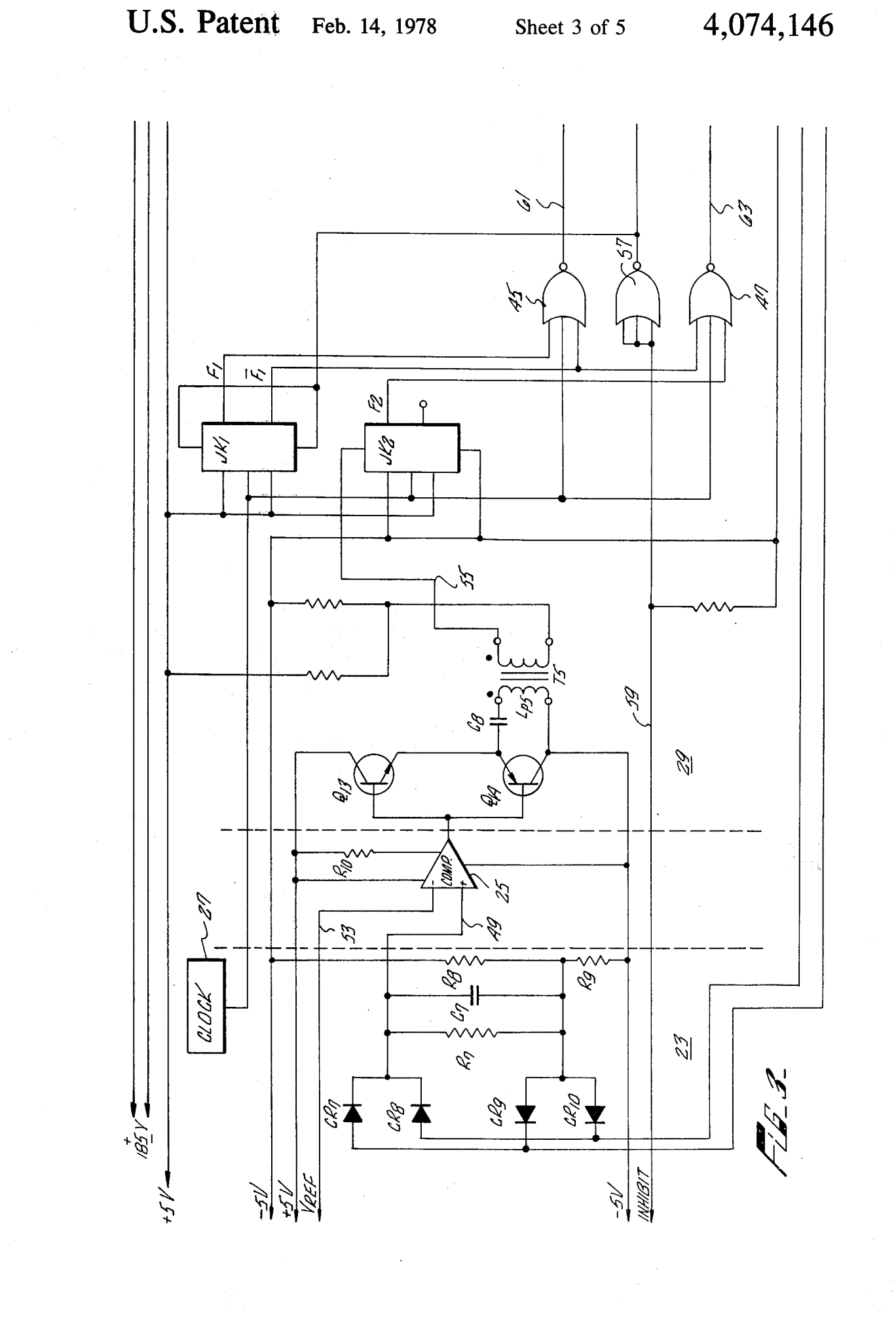

As before noted, the alternating current trapezoidal waveform produced in the primary of the current transformer $T_2$ and illustrated in FIG. 4A is fed back via the secondary of the transformer $T_2$ to the control circuitry of FIG. 3. This signal is full wave rectified by diodes $CR_7$, $CR_8$, $CR_9$, $CR_{10}$ of the control circuitry. The resulting rectified trapezoidal current waveform is converted to a voltage waveform (FIG. 4E) by a resistor $R_7$, which may be connected to a parallel capacitor $C_7$ for noise suppression. The trapezoidal waveform developed across the resistor $R_7$ is then applied via a resistive divider network $R_8$, $R_9$ to the positive input 49 of the comparator 25, whose negative input 53 is supplied by a reference voltage $V_{ref}$. The trapezoidal signal thus presented to the positive input 49 of the comparator 25 is representative of the current level passing through the primary of the power transformer $T_1$ and hence of the output current. Additionally, its duration is representative of the trapezoidal current pulses in the primary of the power transformer $T_1$.

During any interval in which a trapezoidal pulse exceeds the reference voltage $V_{ref}$, the comparator 25 turns on two transistors $Q_{13}$, $Q_{14}$. The first npn driver transistor $Q_{13}$ has its emitter connected to the emitter of the second pnp driver transistor $Q_{14}$. One terminal of a capacitor $C_8$ is connected to the commonly connected emitters of the driver transistors $Q_{13}$, $Q_{14}$. The second terminal of the capacitor $C_8$ is connected to the first terminal of a primary coil $L_{p5}$, whose second terminal is connected in common with the collector of the transistor $Q_{14}$ to a negative source voltage. When the comparator provides the respective bases of the two transistors $Q_{14}$, $Q_{13}$ with a turn-on signal, current passes through the primary coil $L_{p5}$ of the transformer $T_5$. Hence a signal is applied to the preset terminal 55 of a JK flip-flop $JK_2$. The transformer $T_5$ performs an isolating function, in effect isolating all of the control circuitry from the power circuitry.

The control flip-flop $JK_2$ cooperates with a clocking flip-flop $JK_1$ to drive the NOR gates 45, 47, which trigger the driver circuitry 41, 43 of FIG. 2. The clocking flip-flop $JK_1$ has its J and K inputs both connected to the positive voltage source and has its clock input supplied with clock pulses such as shown in FIG. 4B. Its preset and clear inputs are connected to the output of a NOR gate 57, which receives an input from an inhibit line 59. One output $F_1$ of the flip-flop $JK_1$ is supplied as an input to the first driving NOR gate 45 and the other output $\overline{F}_1$ is supplied as an input to the second driving NOR gate 47. Each of these driving NOR gates 45, 47 receives a second input from the system clock signal and a third input from the output $F_2$ of the control flip-flop $JK_2$. The J input of the control flip-flop $JK_2$ is connected to the negative voltage bias source $V_1$ as is the clear input. The K input of the control flip-flop $JK_2$ is connected to the positive bias source.

The operation of the control circuitry is as follows. Because of its biasing, the clocking flip-flop $JK_1$ changes state in response to each clock pulse. The signals at the outputs $F_1$, $\overline{F}_1$ of the flip-flop $JK_1$ in relation to the clock signals are shown in FIGS. 4C and 4D. The reference level supplied to the comparator 25 is adjusted as shown in FIG. 4E such that at the desired output level the trapezoidal pulses supplied to the comparator 25 slightly exceed the reference level. Hence, the flip-flop $JK_2$ is set by each trapezoidal pulse and is reset by the next clock pulse. Its output $F_2$ is shown in FIG. 4F. The resultant outputs 61, 63 of the driver NOR gates 45, 47 are equal logically to $\overline{F}_1 + \text{clock} + F_2$ and $\overline{\overline{F}_1 + \text{clock} + F_2}$. These outputs are illustrated in FIGS. 4G and 4H respectively.

Thus, the duration of activation of the driver transistors $Q_5$, $Q_6$, $Q_9$, $Q_{10}$ is determined by where in time each trapezoidal pulse exceeds the reference level, triggering flip-flop $JK_2$. If an overcurrent condition develops, $JK_2$ will be triggered earlier, reducing the duration of driver activation and hence output current. Likewise, an undercurrent condition results in later activation of the flip-flop $JK_2$ and a longer duration of activation of the corresponding driver transistors. Overall, this operation results in a constant current output.

Additionally, voltage regulation is achieved by the circuit of the preferred embodiment. For example, the collector voltage of one of the power transistors $Q_1$ is shown in FIG. 4I. Since the duration of this collector voltage is determined by the same $JK_2$ trigger points discussed above, the output voltage resulting from the integrating effect of the power output circuitry 19 is held at a constant level.

Since the output current is held constant by the functioning of the control circuitry 13 in the preferred embodiment of the invention, the power converter of the preferred embodiment is essentially a constant current source. Great flexibility arises from this fact because, as shown in FIG. 5, any number of such current sources can be paralleled to provide any desired amount of power. This fact is of great significance because widely varying amounts of power are required by the diverse data processing systems now in use.

As is apparent, the reference voltage $V_{ref}$ (comparable to element 21 in FIG. 4) may be varied in order to vary the current output of the power supply. The average voltage level will also vary accordingly. As shown in FIG. 5 a common reference voltage Vc may be used in all of a number of modules connected to a power bus 47. Such modules 45 are represented essentially as voltage controlled current sources. Where the reference voltage Vc is an error signal derived by comparing the voltage supplied to a load 49 against a second reference voltage, 55, the entire system will be voltage regulated. Such an error signal may be derived, as well-known in the art, by an error amplifier 51, a summer 53 and a suitable reference source 55. An unlimited number of blocks 45 constructed according to the invention may be connected to a power bus.

Two other desirable features inhere in the power converter circuitry described above. First, the switching transistors pairs are forced to have the same current output, i.e., the circuit is balanced to prevent power transformer saturation. Second, the inputs to the flip-flops $JK_1$ and $JK_2$ are isolated from the comparator circuit by a pulse transformer $T_5$. In effect, all of the logic and gating circuitry is thereby isolated from the power circuitry.

In addition to those modifications described above, many others may be made in the preferred embodiment of the invention without departing from the scope and spirit thereof. Therefore, it is to be understood that, within the scope of the appended claims, the invention may be practiced other than as specifically described.

What is claimed is:

1. A modular power supply system for connection to a power bus supplying a load, said modular power supply system comprising:
    a first power supply module connected to said bus which includes current feedback means for maintaining a constant current output, the level of said current output being adjustable in response to a first settable reference voltage level; and
    at least a second power supply module connected to said power bus and including current feedback means for maintaining a constant current output, the level of said current output being adjustable in response to a second settable reference voltage level;
    means for monitoring the voltage across said load and developing an error signal indicating a departure of the voltage across said load from a desired level; amd
    a common voltage reference source means outputting a single voltage for supplying said first and second settable reference voltage levels and for responding to said error signal to adjust said common voltage reference to compensate for said departure.

2. A modular power supply system for connection to a power bus supplying a load, said modular power supply system comprising:
    a first power supply module connected to said bus which includes current feedback means for maintaining a constant current output, the level of said current output being adjustable in response to a first settable reference voltage level; and
    at least a second power supply module connected to said power bus and including current feedback means for maintaining a constant current output, the level of said current output being adjustable in response to a second settable reference voltage level;
    means for monitoring the voltage across said load and developing an error signal indicating the amount of departure of the voltage across said load from a desired level; and
    a common voltage reference source means which develops a common single reference voltage level for all the modular power supplies in the system, said common reference voltage level supplying said first and second reference voltage levels to said first and second power supply modules, said common voltage reference source means being a function of said error signal and operating to adjust said common reference voltage level to compensate each of the power supply modules individually to correct any departure of the voltage across said load from the desired level.

3. A regulated electric power system comprising:
(a) a load bus and a return bus means;
(b) a plurality of electric energy generator modules connected between said load and said return bus means in a power supply relationship thereto wherein each of said electric generator modules is a constant current device which delivers a constant proportional share of the total current delivered to a load, each of said electric generator modules also having input voltage reference means for determining the value of its constant current output;
(c) an electrical reference signal means representing the desired voltage across said load;
(d) error signal generator means coupled to said load bus and to said reference signal means and applicable to provide an error output signal representative of the difference between the values of the electrical parameters existing at said load bus and the output terminal of said reference signal means;
(e) error signal means which provide a common voltage reference source which common voltage reference source is individually applied to each of said electrical power generation modules, said electrical power generation modules being regulatable by use of voltage reference input in order to control the value of the constant current output which is provided as a proportionate share of the total load.

4. A power supply system involving a plurality of individual power supply modules each of which act to supply a constant current as a proportional share of the total load, said system comprising:
(a) a plurality of power supply modules each of said power modules being a constant current device having a current feedback line which is converted within said module into a voltage to permit voltage control of the value of the output current and wherein said plurality of modules are connected in parallel to a power bus which supplies a load;
(b) means for monitoring the voltage across said load and developing an error signal indicating a departure of the voltage across said load from a desired level;
(c) a reference voltage producing unit representing the desired voltage across said load;
(d) a common voltage reference source means which outputs a voltage for supplying a common reference voltage level to each of said power supply modules, said source means responding to said error signal in order to adjust said common voltage reference to compensate for said voltage departure;
(e) each of said constant current power supply modules involving a constant current DC power source supplied by an unregulated DC power level and having current switching devices and transformers for converting the unregulated DC level to an AC signal which is then converted to a constant current DC output level for delivery to a load and wherein each such power supply module includes:
(e1) a settable input reference voltage, adjustable to determine the value of the level of the constant current output of that module;
(e2) means for developing fixed frequency clock pulses;
(e3) logic means for controlling said clock pulses to cause said switching devices to have a controlled duration for a switch-on pulse;
(e4) means for generating a control signal derived from comparison of a settable voltage reference signal against a voltage feedback signal derived from a current feedback line from said AC signal, said control signal being used to determine the duration of said switch-on pulse;
(e5) means for sensing said AC signal and feeding back a current which is converted to a proportional voltage usable to be compared with said settable reference voltage;
(e6) isolation means for separating said current switching devices from said AC signal sensing means, from said control signal generating mans and from said logic means.

* * * * *

UNITED STATES PATENT OFFICE
CERTIFICATE OF CORRECTION

Patent No. 4,074,146      Dated February 14, 1978

Inventor(s) Carlos E. Buonavita

It is certified that error appears in the above-identified patent and that said Letters Patent are hereby corrected as shown below:

Col. 3, line 1, change "$C_4$" to —$C_0$—;

line 12, change "teerminal" to —terminal—;

line 33, change "input" to —output—.

Col. 4, line 44, between "the" and "trapezoidal", insert —duration of the —

Col. 6, line 38, change "amd" to —and—.

Signed and Sealed this

Thirteenth Day of June 1978

[SEAL]

Attest:

RUTH C. MASON
*Attesting Officer*

DONALD W. BANNER
*Commissioner of Patents and Trademarks*